United States Patent [19]

Nasukawa

[11] Patent Number: 5,761,631
[45] Date of Patent: Jun. 2, 1998

[54] PARSING METHOD AND SYSTEM FOR NATURAL LANGUAGE PROCESSING

[75] Inventor: Tetsuya Nasukawa, Hachioji, Japan

[73] Assignee: International Business Machines Corporation, Armonk, N.Y.

[21] Appl. No.: 501,749

[22] Filed: Jul. 12, 1995

[30] Foreign Application Priority Data

Nov. 17, 1994 [JP] Japan .................. 6-283087

[51] Int. Cl.$^6$ .................................................. G06F 17/27
[52] U.S. Cl. ............................................................ 704/9
[58] Field of Search ..................... 395/751, 752, 395/754, 755, 759, 760; 704/1, 2, 4, 5, 9, 10

[56] References Cited

U.S. PATENT DOCUMENTS

| | | |
|---|---|---|
| 5,128,865 | 7/1992 | Sadler . |
| 5,136,503 | 8/1992 | Takagi et al. . |
| 5,225,981 | 7/1993 | Yokogawa . |
| 5,297,039 | 3/1994 | Kanaegami et al. . |
| 5,311,429 | 5/1994 | Tominaga . |
| 5,396,419 | 3/1995 | Morimoto . |
| 5,424,947 | 6/1995 | Nagao et al. . |
| 5,495,413 | 2/1996 | Kutsumi et al. . |

*Primary Examiner*—Robert A. Weinhardt

[57] ABSTRACT

The present invention provides a method and system to improve the accuracy of natural language processing systems by enabling them to acquire a parsing output that is accurate to a degree for any type of sentence. The feature of the present invention is that a sentence (a non-grammatical, ill-formed sentence) that cannot be parsed when using a conventional parsing process, which relies on grammatical knowledge, is re-analyzed by using the parsing results for an identical word row in a sentence (a well-formed sentence) in the same context that could be parsed. More specifically, the processing below is performed: (1) a well-formed sentence in a context that includes a word row that is identical to a word row in an ill-formed sentence is searched for, and a dependency structure for that word row is extracted from the parsing results for the well-formed sentence; and (2) the dependency structures of the phrases obtained in (1) are linked by referring to linking information for the well-formed sentence and a grammar, and the dependency structure of the entire sentence is introduced.

22 Claims, 20 Drawing Sheets

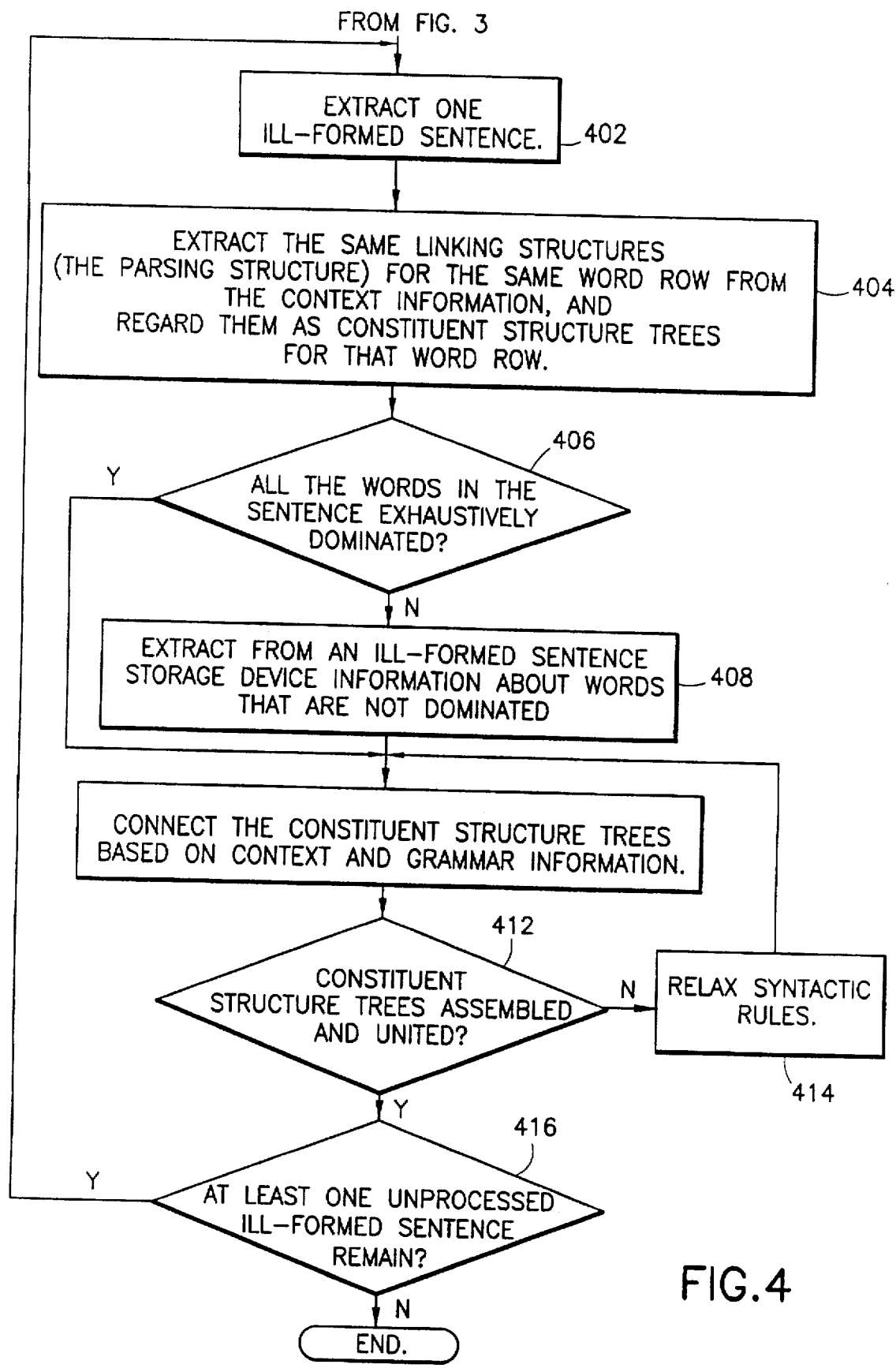

```
((XXXX (COMMENT (CONJ "AS")
               (NP (PRON* "YOU" ("YOU" (SG PL))))
               (AUXP (VERB* "CAN" ("CAN" PS)))
               (VERB* "SEE" ("SEE" PS)))
        (PUNC ",")
        (VP (NP (PRON* "YOU" ("YOU" (SG PL))))
            (AUXP (VERB* "CAN" ("CAN" PS)))
            (VERB* "CHOOSE" ("CHOOSE" PS))
            (PP (PREP* "FROM")
                (QUANP (ADJ* "MANY" ("MANY" BS)))
                (NOUN* "TOPICS" ("TOPIC" PL))))
            (INFTO (PREP* "TO"))
            (VERB* "FIND" ("FIND" PS))
            (COMPCL (COMPL "")
                    (VERB* "OUT" ("OUT" PS))
                    (NP (PRON* "WHAT"
                               ("WHAT" (SG PL)))))
        (VP* (INFCL
            (NP (NOUN* "INFORMATION" ("INFORMATION" SG)))
            (VERB* "IS" ("BE" PS))
            (AJP (ADJ* "AVAILABLE" ("AVAILABLE" BS))
                 (PP (PREP* "ABOUT")
                     (DETP (ADJ* "THE" ("THE" BS)))
                     (NP (NOUN* "TNOUN1" ("TNOUN1" (SG PL)))
                         (NOUN* "SYSTEM" ("SYSTEM" SG)))))))
        ?)
(PUNC ".")) 0)
```

FIG. 5

AS YOU CAN SEE, YOU CAN CHOOSE FROM MANY TOPICS TO FIND OUT

```
CJ  PN  N   V   PN  N   V   PP      AJ  N   PP          N   AJ
AV              V               (TOPIC)     AV  V   PP      N
PP                              AJ  N                       PP
                                AV  PN                      V
                                PP
```

WHAT INFORMATION IS AVAILABLE ABOUT THE AS/400 SYSTEM.
```
            (BE)
        N   V   AJ         AJ  DET ?   N
AJ
AV
PN
```

FIG. 6

AS YOU CAN SEE, YOU CAN CHOOSE FROM MANY TOPICS TO FIND OUT

AS YOU CAN SEE, ⎯ 39 SENTENCE 175 SENTENCE
      YOU CAN CHOOSE ⎯ 179 SENTENCE
         CHOOSE ⎯ 145 SENTENCE
           MANY ⎯ 49 SENTENCE
             TOPICS ⎯ 39 140 145 160 160
                161 167 169 179 201
                202 203 237 SENTENCE
               TO FIND ⎯ 236 SENTENCE
                FIND OUT WHAT ⎯ 32 SENTENCE

WHAT INFORMATION IS AVAILABLE ABOUT THE AS/400 SYSTEMS. ⎯ 49 SENTENCE

WHAT INFORMATION IS AVAILABLE ABOUT THE ⎯ 49 SENTENCE.
                THE AS/400 SYSTEM. ⎯ 6 109 115 SENTENCE

FIG. 7

"AS YOU CAN SEE, THE HELP DISPLAY PROVIDES ADDITIONAL INFORMATION ABOUT THE MENU OPTIONS AVAILABLE, AS WELL AS A LIST OF RELATED TOPICS." (39 SENTENCE)
"AS YOU CAN SEE, THE DISPLAY PROVIDES YOU WITH BRIEF INSTRUCTIONS ABOUT THE PROCEDURE." (175 SENTENCE)

```
((DECL (SUBCL (CONJ "AS")
              (NP    (PRON* "YOU" ("YOU" (SG PL))))
              (AUXP  (VERB* "CAN" ("CAN" PS)))
              (VERB* "SEE" ("SEE" PS))
              (PUNC  ","))
       (NP    (DETP  (ADJ* "THE" ("THE" BS)))
              (NP    (NOUN* "HELP" ("HELP" SG)))
              (NOUN* "DISPLAY" ("DISPLAY" SG)))
       (VERB* "PROVIDES" ("PROVIDE" PS))
```

CONTEXT INFORMATION FOR "AS YOU CAN SEE,"

FIG. 8

"WHEN A MATCH IS FOUND (WITHIN A MATTER OF SECONDS), THE SYSTEM PRESENTS A LIST OF TOPICS FROM WHICH YOU CAN CHOOSE TO GET SPECIFIC INFORMATION." (179 SENTENCE)

```
(NOUN*  "TOPICS" ("TOPIC" PL))
(RELCL (PP      (PP    PREP* "FROM"))
       (PRON*  "WHICH" ("WHICH" (SG PL))))
       (NP     (PRON*  "YOU" ("YOU" (SG PL))))
       (AUXP   (VERB*  "CAN" ("CAN" PS)))
       (VERB*  "CHOOSE" ("CHOOSE" PS))
       (INFCL  (INFTO (PREP* "TO"))
               (VERB* "GET" ("GET" PS))
```

CONTEXT INFORMATION FOR "YOU CAN CHOOSE"

FIG. 9

"NOTICE THAT THE TOPICS YOU HAVE ALREADY CHOSEN HAVE THE > SYMBOL IN FRONT OF THEM." (145 SENTENCE)

```
(NOUN*  "TOPICS" ("TOPIC" PL))
(RELCL (NP     (PRON*  "YOU" ("YOU" (SG PL))))
       (AUXP  (VERB*  "HAVE" ("HAVE" PS)))
       (AVP   (ADV*   "ALREADY" ("ALREADY" BS)))
       (VERB* "CHOSEN" ("CHOOSE" EN))))
```

CONTEXT INFORMATION FOR "CHOOSE"

FIG. 10

"THE INFORMATION ASSISTANT OPTIONS MENU PROVIDES MANY DIFFERENT OPTIONS FOR LEARNING ABOUT WHAT INFORMATION IS AVAILABLE ABOUT THE SYSTEM, HOW YOU CAN COMMENT ON INFORMATION, AND WHAT ARE THE HIGHLIGHTS OF THIS RELEASE." (49 SENTENCE)

```
(NP  (QUANP (ADJ* "MANY" ("MANY" BS)))
     (AJP   (ADJ* "DIFFERENT" ("DIFFERENT" BS)))
     (NOUN* "OPTIONS" ("OPTION" PL))
```

CONTEXT INFORMATION FOR "MANY"

FIG. 11

"AS YOU CAN SEE, THE HELP DISPLAY PROVIDES ADDITIONAL INFORMATION ABOUT THE MENU OPTIONS AVAILABLE, AS WELL AS A LIST OF RELATED TOPICS." (39 SENTENCE)
(OTHER 140 145 160 161 167 169 179 201 202 203 237 SENTENCE)

39 SENTENCE
(PP    (PP    (PREP*  "OF"))
 (AJP  (ADJ*  "RELATED"  BS)))
       (NOUN* "TOPICS" ("TOPICS" PL)))))

CONTEXT INFORMATION FOR "TOPICS"

FIG. 12

"INDEX SEARCH INFORMATION ALLOWS YOU TO FIND INFORMATION ABOUT SPECIFIC TASKS OR CONCEPTS." (236 SENTENCE)

(VERB* "ALLOWS" ("ALLOW" PS))
(NP    (PRON* "YOU" ("YOU" SG PL)))
(INFCL (INFTO (PREP* "TO"))
       (VERB* "FIND" ("FIND" PS))
(NP    (NOUN* "INFORMATION" ("INFORMATION" SG))

CONTEXT INFORMATION FOR "TO FIND"

FIG. 13

"EXTENDED HELP INFORMATION CAN BE USED TO HELP YOU FIND OUT
WHAT TO DO WITH THIS MENU." (32 SENTENCE)

(VERB* "HELP" ("HELP" PS))
 (NP (PRON* "YOU" ("YOU" (SG PL)))
  (INFCL (VERB* "FIND" ("FIND" PS))
   (PP (PREP* "OUT"))
    (PRON* "WHAT" ("WHAT" (SG PL)))
   (INFCL (INFTO (PREP* "TO"))
    (VERB* "DO" ("DO" PS))
    (PP (PREP* "WITH")
     (DETP (ADJ* "THIS" ("THIS" BS))
      (NOUN* "MENU" ("MENU" SG))))))))

CONTEXT INFORMATION FOR "FIND OUT WHAT"

FIG. 14

"THE INFORMATION ASSISTANT OPTIONS MENU PROVIDES MANY DIFFERENT OPTIONS FOR LEARNING ABOUT WHAT INFORMATION IS AVAILABLE ABOUT THE SYSTEM, HOW YOU CAN COMMENT ON INFORMATION, AND WHAT ARE THE HIGHLIGHTS OF THIS RELEASE." (49 SENTENCE)

(VERB* "LEARNING" ("LEARN" PG))
(PP (PP (PREP* "ABOUT")
    (AJP (ADJ* "WHAT" ("WHAT" BS)))
    (NOUN* "INFORMATION" ("INFORMATION" SG))
    (VP (VERB* "IS" ("BE" PS))
    (AJP (ADJ* "AVAILABLE" ("AVAILABLE" BS))
    (PP (PREP* "ABOUT")
    (DETP (ADJ* "THE" ("THE" BS)))
    (NOUN* "SYSTEM" ("SYSTEM" SG))
    (PUNC ","))

CONTEXT INFORMATION FOR "WHAT INFORMATION IS AVAILABLE ABOUT THE"

FIG. 15

"THE HELP KEY IS YOUR LINK TO THE HELP INFORMATION ON THE AS/400 SYSTEM." (6 SENTENCE)
"THE AS/400 SYSTEM PROVIDES THREE WAYS TO GET HELP FOR FIELDS:." (115 SENTENCE)
"YOU CAN QUICKLY NAVIGATE THE LARGE AMOUNT OF HELP INFORMATION PROVIDED ON THE AS/400 SYSTEM THROUGH THE USE OF HYPERTEXT." (115 SENTENCE)

```
   6 SENTENCE
  (NOUN* "HELP INFORMATION" ("HELP INFORMATION" SG))
  (PP     (PP     (PREP* "ON"))
          (DETP   (ADJ* "THE" ("THE" BS)))
          (NP     (NOUN* "AS/400" ("AS/400" SG)))
          (NOUN* "SYSTEM" ("SYSTEM" SG)))))
 109 SENTENCE
  (DECL (NP     (DETP   (ADJ* "THE" ("THE" BS)))
                (NP     (NOUN* "AS/400" ("AS/400" SG)))
                (NOUN* "SYSTEM" ("SYSTEM" SG)))
        (VERB* "PROVIDES" ("PROVIDE" PS))
 115 SENTENCE
  (PTPRTCL(VERB* "PROVIDED" ("PROVIDE" (ED EN)))
  (PP     (PP     (PREP* "ON"))
                  (DETP (ADJ* "THE" ("THE" BS)))
                  (NP   (NOUN* "AS/400" (AS/400" SG)))
                  (NOUN* "SYSTEM" ("SYSTEM" SG)))
  (PP     (PP     (PREP* "THROUGH"))
                  (DETP  (ADJ* "THE" ("THE" BS)))
                  (NOUN* "USE" ("USE" SG))
```

CONTEXT INFORMATION FOR "THE AS/400 SYSTEM"

FIG. 16

NARROWING DOWN PARTS OF SPEECH BY CONTEXT INFORMATION

FIG. 17

```
AS YOU CAN SEE, YOU CAN CHOOSE FROM MANY TOPICS TO FIND OUT
CJ PN    N    V       PP   AJ   N    PP  N    AJ
AV                         PN                 N
PP                                            V
                                         AV
                                         PP

AS YOU CAN SEE, ──── 39 SENTENCE 175 SENTENCE
CJ PN V   V                  ──── 179 SENTENCE
   PN
     YOU CAN CHOOSE
     PN   V    V
                CHOOSE ──── 145 SENTENCE
                   V
                         MANY ──── 49 SENTENCE
                         AJ  TOPICS ──── 39 140  145  160 160
                                         161 167  169 179 201
                                         202 203  237 SENTENCE
                                                  236 SENTENCE
                             TO FIND ──── FIND OUT WHAT ──── 32 SENTENCE
                             PP   V            V   PP    PN

WHAT INFORMATION IS AVAILABLE ABOUT THE AS/400 SYSTEM. ──── 6 109 115 SENTENCE
AJ   N          V  AJ       PP    DET   N
AV                 AV
PN                 PP

WHAT INFORMATION IS AVAILABLE ABOUT THE ──── 49 SENTENCE
AJ   N          V  AJ       PP    DET
                                    THE AS/400 SYSTEM ?
                                    DET   N

│↓↓↓ PARTS OF SPEECH NARROWED DOWN BY │↓↓↓
                                           CONTEXT INFORMATION

AS YOU CAN SEE, YOU CAN CHOOSE FROM MANY TOPICS TO FIND OUT
CJ PN V   V     PN   V    V    PP   AJ   N    PP  V   PP
                                         N
WHAT INFORMATION IS AVAILABLE ABOUT THE AS/400 SYSTEM.
PN   N          V  AJ       PP    DET    N
AJ
```

DEPENDENT STRUCTURE OF "AS YOU CAN SEE,"

DEPENDENT STRUCTURE OF "YOU CAN CHOOSE"

DEPENDENT STRUCTURE OF "MANY"

DEPENDENT STRUCTURE OF "TOPICS"

DEPENDENT STRUCTURE OF "TO FIND"

DEPENDENT STRUCTURE OF "FIND OUT WHAT"

DEPENDENT STRUCTURE OF "WHAT INFORMATION IS AVAILABLE ABOUT THE"

DEPENDENT STRUCTURE OF "THE AS/400 SYSTEM"

LINKING OF CONSTITUENT STRUCTURES

FINAL DEPENDENT STRUCTURE

PARSING METHOD AND SYSTEM FOR NATURAL LANGUAGE PROCESSING

FIELD OF THE INVENTION

The present invention relates to a natural language processing system, and in particular to a technique for parsing a natural language.

DESCRIPTION OF THE BACKGROUND

Generally, a natural language processing system employs the results that are obtained by parsing sentences as a base for further processing, and exactness in parsing will result in an improvement in the accuracy of the system. However, since there exists no grammar that can analyze all the sentences that human beings are capable of producing and understanding, the accuracy attained for the parsing of sentences has actually remained at the 80% level. Further, since as the length of a sentence increases the possibility that an attempt to parse it will fail becomes greater, the possibility of success is lower when word counts are taken into consideration.

Increasing the accuracy that is attained for the parsing of sentences is very important to the design of a robust and practical natural language processing system. A method that can relax grammatical restrictions, such as number correspondence, and can thereafter parse sentences again, and a method that outputs a combination of partial parsing results have been proposed for the parsing of ill-formed sentences that cannot be processed by using a grammar that is provided for the system (Matsumoto: "Present states and trends in robust natural language processing," the 7th Annual Conference of Japanese Society for Artificial Intelligence (JSAI) (1993)). For example, Jensen, et al., proposed the idea of a "fitted parse" in which the results obtained by analyzing the segments of an ill-formed sentence are so linked that they provide a phrase structure to which priority is given based on heuristics (K. Jensen, et al.: "Parse fitting and Prose Fixing: Getting a Hold on Ill-formedness," Computation Linguistics, Vol. 9, No.3–4 (1983)). By such a method, however, the grounds on which parts of speech or a word to be linked with is weak. The accuracy of the analysis result is so low that this method can provide only some results.

Japanese Unexamined Patent Publication Nos. Sho 60-41166, Sho 60-189075, Sho 62-191967, and Sho 63-305464 disclose a technique for obtaining more exact parsing results by referring to the context.

Japanese Unexamined Patent Publication No. Sho 60-41166 discloses the registration of a subject that is to be added and an application condition, and, upon the detection during the translation process of a sentence that has an omitted subject, a pertinent subject is searched for, and is extracted from a storage location and added to the sentence, thus enabling the machine translation of sentences that have no subjects, a characteristic of some Japanese sentences.

Japanese Unexamined Patent Publication No. Sho 60-189075 discloses that, when a target is present in a prior context, a context storage mechanism performs sentence analysis in order to automatically select that target, and can therefore accurately analyze the meaning of the sentence.

Japanese Unexamined Patent Publication No. Sho 62-191967 discloses that context information search means searches a context storage memory for information sent as a key from control means. If such information is present, a value is returned that corresponds to that information, enabling a definite pronoun or an omitted word, such as a subject, to be analyzed in the natural language processing, an ambiguity in the word linking relationship to be reduced, and a sentence relationship to be analyzed.

Japanese Unexamined Patent Publication No. Sho 63-305464 discloses that, when an interpretation choice is a contradictory parsing result or has a contradictory meaning, that choice is abandoned, and another interpretation choice, for which a heuristic rule that has the highest priority is employed, is selected as an interpretation result to provide the most natural interpretation.

The intent of the techniques that are disclosed in those publications is to increase the accuracy of the analysis process for natural language processing by performing that process while referring to context information.

A premise of the above described prior art is that the analyzation of morphemes (a process for separating the words of a sentence and assigning their parts of speech to those words) and the parsing of a sentence (a process for determining how words are connected together) are regarded as well known techniques that provide exact results. Actually, however, it is impossible to provide an exact parse for every sentence that is input, and the current rate of success for parsing is generally around 80%. As for the reason this is true, in some cases it is because input sentences may be grammatically incorrect, and in other cases it is because the grammatical knowledge incorporated in a system is insufficient.

For example, when "Taro soko-de hamo tabeta." is to be processed, it is very difficult to acquire the following analysis, which is the equivalent of "Taro[ga] soko-de hamo[wo] tabeta."

TABLE 1 tabeta - (subjective case) - Taro
      - (case of place) - soko
      - (case of object) - hamo (pike conger)

The above sentence is not easily understood even by human beings. Further, in many cases, machines cannot even parse sentences that are easily understood by human beings.

In such cases, most parsing systems are designed to at least output some results. When the linking and the relationships of words in a sentence cannot be expressed by a single structure, the output that is obtained by applying a specific rule is miserable. When an English sentence is parsed, for example, and "can," which is used as an auxiliary verb, is interpreted as a verb having the meaning "to seal in an airtight container for future use," the machine translation system therefore provides an unexpected result (see, for example, the previous reference, Matsumoto: "Present states and trends in robust natural language processing," the 7th Annual Conference of JSAI (1993)).

When such an incorrect contextual parsing result is provided, a conventional process will fail without question if it is based on the premise that contextual information that is obtained by parsing result is correct.

OBJECTIVES

It is an object of the present invention to provide improved accuracy for natural language processing systems by enabling them to acquire parsing output that is accurate to a degree for any type of sentence.

It is another object of the present invention to provide a method and a system that can acquire correct analyzation results even for a part of a non-grammatical sentence or for a part of a very long sentence that a conventional method cannot analyze.

It is an additional object of the present invention to reduce the possibility that a large error will be output in order to provide the result that matches the other sentences in the same context.

It is a further object of the present invention to provide a method and a system that can so perform parsing that a sentence for which several basic interpretations are possible is interpreted as appropriately as possible by referring to context information.

SUMMARY OF THE PRESENT INVENTION

The above described objects can be achieved by the technique that is incorporated in the present invention, whereby a sentence (a non-grammatical, ill-formed sentence) that cannot be parsed when using a conventional parsing process that relies on grammatical knowledge is re-analyzed by using the parsing results for an identical word row in a sentence (a well-formed sentence) in the same context that could be parsed.

In a discourse within the same context, there is a certain consistency in the tendency of a writer to use his personal vocabulary and in his use of words that are related to the contents. By assuming a characteristic that words that have the same word foundation are essentially the same parts of speech and are linked to similar words, an ill-formed sentence that can not be properly processed by a conventional method can be parsed at a high accuracy.

More specifically, the processing below is performed:

(1) a well-formed sentence in a context that includes a word row that is identical to a word row in an ill-formed sentence is searched for, and a dependency structure for that word row is extracted from the parsing results for the well-formed sentence; and (2) the dependency structures of the phrases obtained in the (1) are linked by referring to linking information for the well-formed sentence and a grammar, and the dependency structure of the entire sentence is introduced.

According to research that was performed by the present applicant, it was confirmed that in computer manuals, etc., 80% or more of the words that appear in identical sentences repeatedly appear in the sentences throughout the prints. It is highly probable that phrases that are included in an ill-formed sentence are also present in a well-formed sentence. Words that are not included in a well-formed sentence are to be processed in the same manner as they would be by a conventional method that relies on a grammar. As long as there are portions of a sentence assembled as phrases, the complexity involved in the analysis of the complete sentence is reduced, and the obtained analysis result may be more exact.

The parsing technique of the present invention that uses context information is applicable not only for the interpreting an ill-formed sentence as accurately as possible, but also for the selection of the most appropriate interpretation for a sentence that can be interpreted in several ways.

BRIEF DESCRIPTION OF THE DRAWINGS

FIG. 4 is a flowchart showing the processing by which an ill-formed sentence is parsed by referring to context information.

FIG. 5 is a diagram showing the parsing output that is obtained by a PEG parser.

FIG. 6 is a diagram showing the assignment of choices of parts of speech by referring to dictionary information.

FIG. 7 is a diagram showing the assignment of context information.

FIG. 8 is a diagram showing the context information for "As you can see,".

FIG. 9 is a diagram showing the context information for "You can choose".

FIG. 10 is a diagram showing the context information for "choose".

FIG. 11 is a diagram showing the context information for "many".

FIG. 12 is a diagram showing the context information for "topic".

FIG. 13 is a diagram showing the context information for "to find".

FIG. 14 is a diagram showing the context information for "find out what".

FIG. 15 is a diagram showing the context information for "what information is available about the".

FIG. 16 is a diagram showing the context information for "the AS/400 system".

FIG. 17 is a diagram showing the narrowing down of parts of speech by referring to context information.

DESCRIPTION OF THE PREFERRED EMBODIMENT

The preferred embodiments of the present invention will now be described while referring to the accompanying drawings.

A. Components for the Processing of the Present Invention

Figure 1:
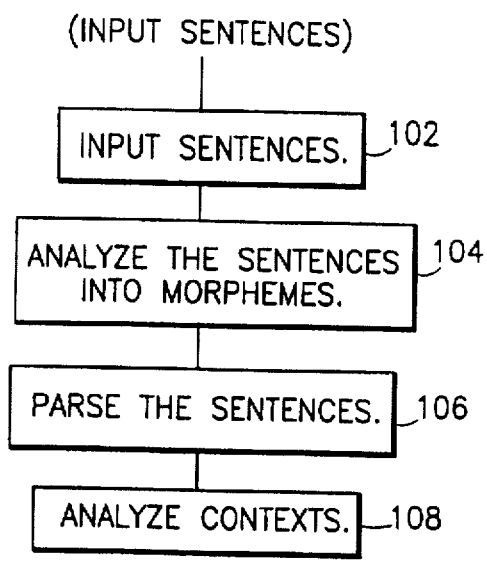
FIG. 1 is a block diagram illustrating components for the processing performed according to the present invention.

FIG. 1 is a flowchart of the high-level component blocks that are involved in the processing performed by the present invention. The components that constitute the blocks are program modules (not shown) that are prepared using a programming language such as C, and are stored on a disk. Usually, these modules are loaded by a Central Processing Unit (CPU) from the disk to a main memory and executed.

In FIG. 1, at an input block 102 individual sentences that have been input in a text file form are acquired.

At a morphological analysis block 104, a sentence that is provided by the input block 102 is decomposed into separate words, and the individual words are analyzed to determine their parts of speech and the manner in which they are used by referring to a dictionary.

At a parsing block 106, a process is performed to obtain information for the construction of a tree structure, which is based on the information output by the morphological analysis block 104.

At a context analyzation block 108, the process that is a characteristic of the present invention is performed. The context information for the complete sentences that are input are stored and then employed with the ill-formed sentences that are output at the parsing block 106 to obtain parsing results that are as appropriate as possible. The details of this process will be described later.

B. Context Analyzation Block

Figure 2:
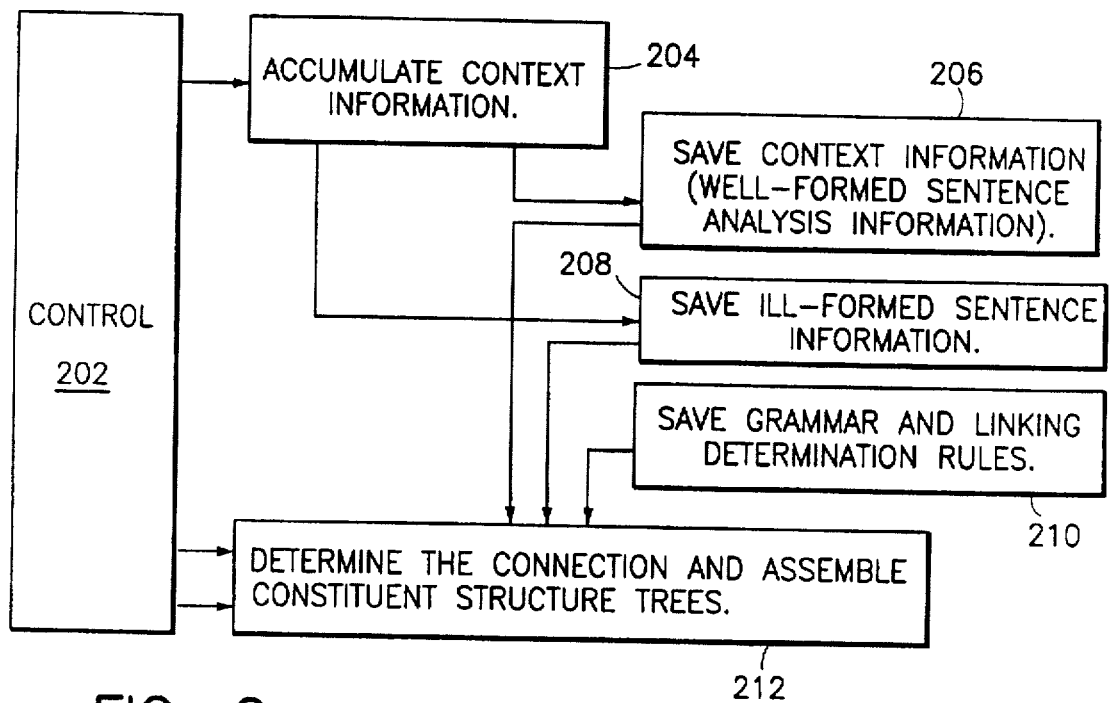
FIG. 2 is a diagram illustrating the arrangement of a context parsing block according to the first embodiment of the present invention.

The detailed logic structure of the context analyzation block 108 will now be explained while referring to FIG. 2. In FIG. 2, a control block 202 controls the operations of the components that constitute the context analyzation block 108, and serves as the main routine for the program.

Within a context information accumulation block (unit) 204, a procedure is performed to determine whether the individual sentences are well-formed. The information that is obtained for well-formed sentences is stored in a context information (well-formed sentence analysis information) storage block (unit) 206, and the information for the ill-formed sentences is stored in an ill-formed sentence information storage block (unit) 208.

In a grammar and linking determination rule storage block (unit) 210 are stored grammar and linking determination rules for the assembly of constituent structure trees for each sentence. It is preferable that a plurality of linking determination rules be stored, and that they include a stricter linking determination rule and a more relaxed linking determination rule.

In a linking determination and constituent structure tree assembling block (unit) 212, the constituent structure trees are assembled by applying the grammar and the linking determination rules, which are stored in the grammar and linking determination rule storage block 210, to the sentence information, which is provided by the context information storage block 206 or the ill-formed sentence information storage block 208.

C. Outline of the Processing

Figure 3:
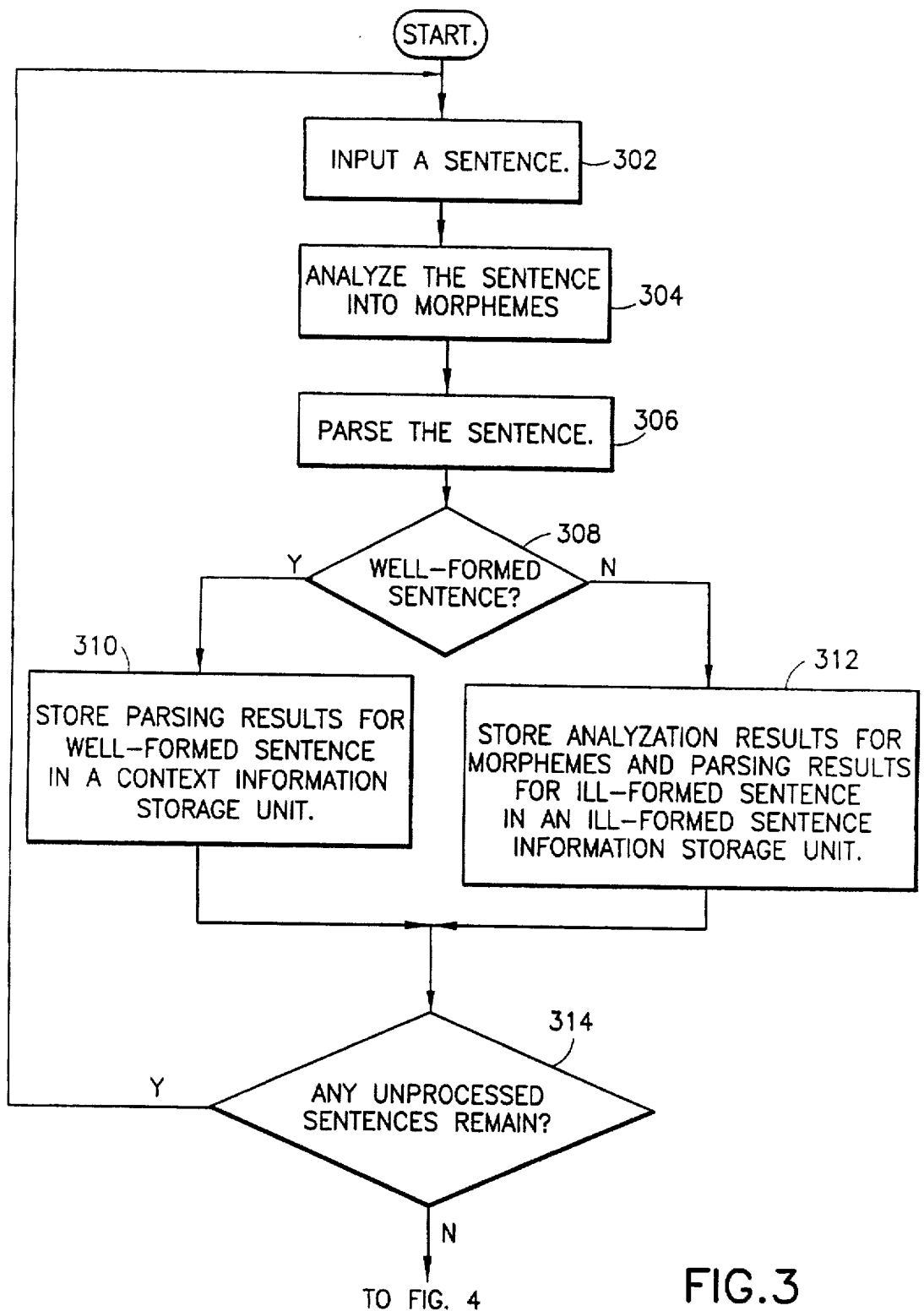
FIG. 3 is a flowchart showing the processing by which an ill-formed sentence is parsed by referring to context information.
Figure 18:
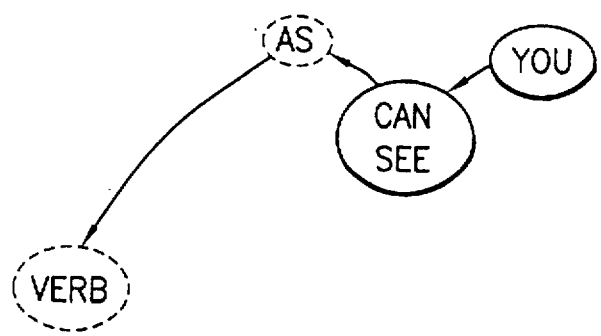
FIG. 18 is a diagram showing a dependency structure of "As you can see".
Figure 19:
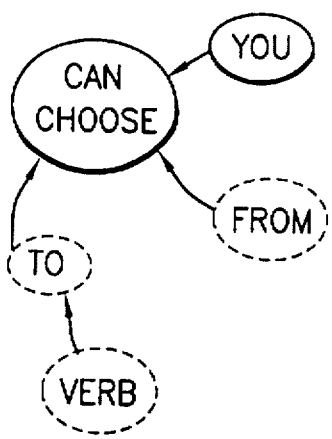
FIG. 19 is a diagram showing a dependency structure of "You can choose".
Figure 20:
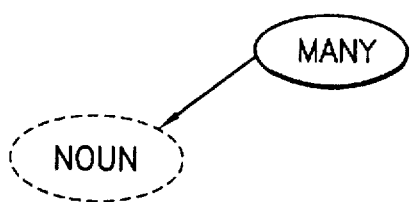
FIG. 20 is a diagram showing a dependency structure of "many".
Figure 21:
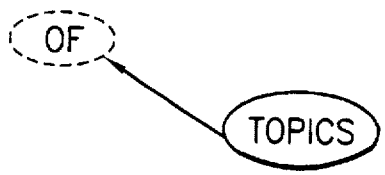
FIG. 21 is a diagram showing a dependency structure of "topics".
Figure 22:
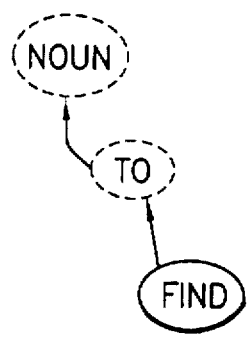
FIG. 22 is a diagram showing a dependency structure of "to find".
Figure 23:
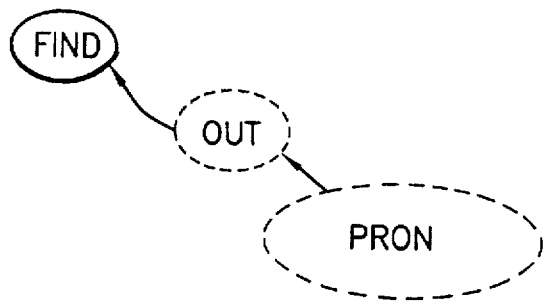
FIG. 23 is a diagram showing a dependency structure of "find out what".
Figure 24:
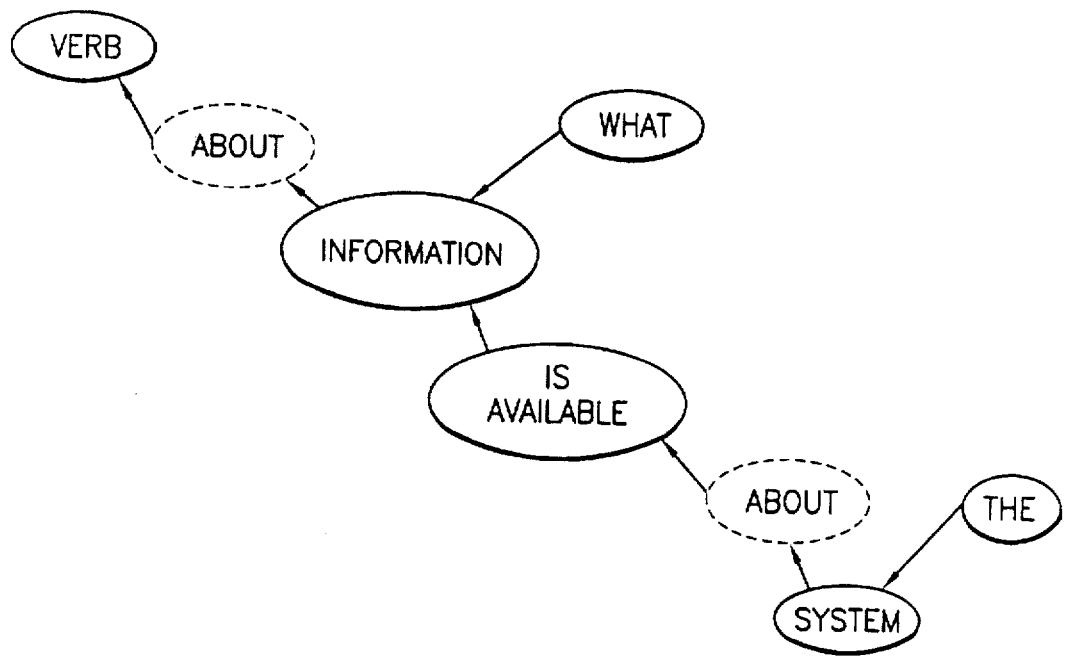
FIG. 24 is a diagram showing a dependency structure of "what information is available about the".
Figure 25:
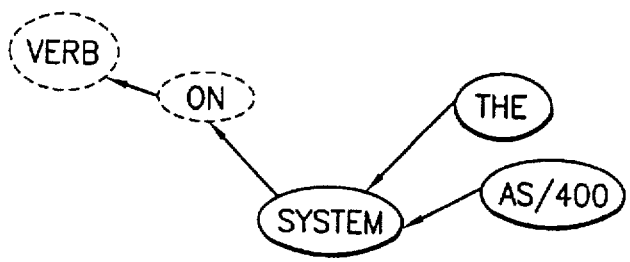
FIG. 25 is a diagram showing a dependency structure of "AS/400 system".

The outline of the processing that is performed within the blocks in FIGS. 1 and 2 will be described while referring to the flowcharts in FIGS. 3 and 4. In FIG. 3, sentences are input at step 302. Reading is performed in units of a single sentence that is terminated by a full stop, a "." in English.

At step 304, a morphological analysis process is performed during which each sentence that is input is decomposed into separate words, and the parts of speech and the manner in which the individual words are used are determined by examining a dictionary.

At step 306, in consonance with the information that was obtained during the morphological analysis, the parsing of the sentence is performed, and information that is employed for the assembly of structure trees is generated.

At step 308, a check is performed to determine whether or not the parsing result indicates that the sentence is well-formed. If the sentence is not well-formed, that can not be analyzed by the parsing system. A specific example is represented below.

Suppose that an English parser is designed that includes only the following simple grammar rules.

TABLE 2

| (a) NOUN ← apple | [apple is a noun] |
| (b) NOUN ← pie | [pie is a noun] |
| (c) NOUN ← Tom | [Tom is a noun] |
| (d) DET ← a | [a is a determiner] |
| (e) DET ← an | [an is a determiner] |
| (f) VERB ← eats | [eats is a verb] |
| (g) NP ← DET NOUN | [an article and a noun construct a noun phrase] |
| (h) VP ← VERB NP | [a verb and a noun phrase construct a verb phrase] |
| (i) SENT ← NOUN VP | [a noun and a verb phrase construct a sentence] |

Suppose then that this parser is employed to analyze the following sentences:

(1) Tom eats an apple.
(2) Tom eats a pie.
(3) Tom eats an apple pie.

In case (1), the constituents construct one sentence in the manner below:

TABLE 3

```
                                    Rules to be applied
Tom    eats    an    apple.         -------------------
 ↓      ↓      ↓      ↓              (c) (f) (e) (a)
NOUN   VERB   DET   NOUN
              ----↓----              (g)
                 NP
       --------↓--------             (h)
                VP
--------↓-----------------           (i)
        SENT
```

In case (2), it is also possible to employ the constituents to construct a sentence; but in case (3), since there is no grammar rule available that permits the construction of a noun phrase "apple pie."

TABLE 4

```
Tom    eats    an    apple.    pie.
 ↓      ↓      ↓      ↓         ↓     (c) (f) (e) (a) (b)
NOUN   VERB   DET   NOUN
              ----↓------.            (g)
                 NP
       -----↓------------.            (h)
                VP
------↓------------------.            (i)
      SENT                    NOUN
``` at the end there remain two discrete grammatical groups, SENT and NOUN, and the structure of case (3) can not be analyzed as a single sentence. A sentence, such as in case (3), that is so structured that it cannot be broken down by a parser and reconstructed properly is called an ill-formed sentence. Ill-formed sentences may be classified as:

(A) non-sentences (sentences that native speakers would consider grammatically incorrect because of the extraordinary omission of words or because of typing input errors); and (B) sentences that can not be analyzed because of the presence of words (unknown words) that are not registered in a dictionary or because the grammar is not adequate.

Generally, as long as there is an adequate grammar, most of ill-formed sentences should be those that can be described by (A). Actually, however, most ill-formed sentences belong to case (B) because their sentence structures are complicated by their lengths or by parallel structures that use "and" and "or." Even when a well prepared grammar is used, of the sentences in a discourse, there are normally 10 to 20% that may be considered to be ill-formed. Such an ill-formed sentence is easily recognized because the parser output is not integrated, and because the positive parser output generally describes an ill-formed sentence. Therefore, referring back to FIG. 3, at step 308 an absolute determination of whether a sentence is well-formed can be obtained that is based on the processing results that are provided by the parsing system (parser) at step 306.

When, at step 308, the sentence is well-formed, at step 310 the parsing results for that well-formed sentence are stored in the context information storage unit 206. These results consist of context information for each sentence, and context information for each word that is extracted from the context information for each sentence. The context information for each sentence consists of a sentence number, an input character row, and parsing results (information that describes the relationship of each word in a sentence to the other words (a subjective case, an objective case, a preposition, etc.)). The context information for each word consists of a character row for a surface word (an original form), a word (or its ID) that is related to the original word and their relationship, and a word (or its ID) that the original word is related to and their relationship.

If, at step 308, the sentence is ill-formed, at step 312 the results that are obtained by analyzing the morphemes of the ill-formed sentence are stored in the ill-formed sentence information storage unit 208 in addition to the information for the parsing results that are described at step 310. The results that are obtained by the morphological analysis must be stored because the ill-formed sentence must later be parsed again by re-using the analyzation results for the morphemes while referring to context information.

When the procedure at step 310 or 312 is completed, at step 314 a check is performed to determine whether all sentences have been processed. If there is at least one sentence remaining that has not yet been processed, program control returns to step 302.

If, at step 314, there is no sentence remaining to be processed, it is assumed that the parsing of the sentences in the input discourse has been completed, and program control moves to the flowchart in FIG. 4. The processing unit by which at step 314 it is determined that the processing has been completed is generally 100 to 300 sentences (about the equivalent in size, for example, of one chapter of a computer manual). A user, however, can designate processing units as needed.

At step 402, in FIG. 4, one ill-formed sentence is extracted from the ill-formed sentence information storage unit 208. At step 404, the linked (parsed) structure for an identical word row is extracted from well-formed context information, i.e., the information that is stored in the context information storage unit 206, and is regarded as a constituent structure tree for that word.

At step 406, a check is performed to determine whether or not all the words in the sentence can be dealt with at step 404. If they can not, at step 408 context information for each of the words that cannot be dealt with is extracted from the ill-formed sentence information storage unit 208.

At step 410, the constituent structure trees are linked together by referring to the thus obtained context information and grammar information that is provided from the grammar and linking determination rule storage unit 210. An example algorithm in which context information is applied will be described later.

At step 412, a check is performed to determine whether or not the constituent structure trees have been assembled. When they have been assembled, program control advances to step 416. When it is determined at step 416 that at least one ill-formed sentence still remains, program control returns to step 402.

If, at step 412, the constituent structure trees could not be assembled, program control moves to step 414. The linking rule is relaxed so that it is possible to link together the constituent structure trees that could not be connected. Program control then returns to step 410 and the linking of the constituent structure trees is again performed.

When the process for linking the constituent structure trees is completed, and at step 416 it is determined that all the ill-formed sentences have been processed, this process is terminated.

D. Context Information Application Process

An algorithm for the application of the context information that is performed at step 410 and the following steps will now be explained.

In general, not all the words in an ill-formed sentence are separate and in disorder, and there are analyzation results for a part of a sentence that remain as a parser output and structures that indicate the relationship of portions that match the context information. The parser outputs an analysis of the complete sentence as results that are obtained by linking together the partial linked structures. The context information is also used for this process.

The procedures of the context information application process are as follows:

(1) A plurality of constituent structure trees are arranged according to word order. Example: (A, B, C, D, and E are individual constituent structure trees.)

|A|B|C|D|E|... |

(2) Constituent structure trees are extracted by twos in order from the left, and the linking possibility for each pair of constituent structure trees is examined according to the linking rule (the details of the linking rule and the determination of the linking possibility for constituent structure trees will be explained later). Example: In the case of |A|B|C|D|E|... |, the linking possibilities of the adjacent constituent structure trees, such as A and B, B and C, C and D, and D and E, are examined.

(3) If constituent structure trees that can be linked are found through the examination at (2), these constituent structure trees are linked together, and the process is returned to (2) (after the process is returned to (2), the stricter linking rule is employed again). Example: If C and D can be linked together, a tree, CD, which is obtained by linking these two, is constructed as follows:

|A|B|C|D|E|...|

The process then returns to (2), and the linking possibilities for the adjacent constituent structure trees, A and B, B and CD, and CD and E, are examined.

(4) If no constituent structure trees are found that can be linked during the examination at (2), the linking rule is relaxed by one rank and the process is returned to (2).

(5) When all the constituent structure trees have finally been linked together, the process is terminated.

E. Linking Rule for Examining the Linking Possibility (i) Linking determination that is governed by the presence of the same linking relationship of the same words in the identical context (an examination is conducted to determine whether or not the connection of a two-word phrase is present in a context, and if so, that phrase is linked). Example: If there is a sentence, "He goes to school by car" in the context, and linking information "'car' relates to 'go' via 'by'" is present, "by car" in the ill-formed sentence, ". . . go . . . by car . . . " is determined to relate to "go."

(ii) Linking determination that is governed by the presence of the same linking relationship for synonyms in the same context (an examination it conducted to determine whether or not the connection of a synonym of either word in a two-word phrase is present in the context). Example: If there is a sentence, "He goes to school by car," and linking information "'car' relates to 'go' via 'by'" is present, "by motorcar" (defined as a synonym for 'car' in "The New Collins Thesaurus" by Collins) in the ill-formed sentence ". . . go . . . by motorcar . . ." is determined to relate to "go."

(iii) Examination to determine whether or not the connection of a word having the same part of speech as that of either word in a two-word phrase is present in the context (information). Example: If there is a sentence, "He goes to school by car;" and linking information "'car' relates to 'go' via 'by'" is present, 'by bird' (a noun that is the same part of speech as 'car') in the ill-formed sentence ". . . go . . . by bird . . ." relates to 'go.'

(iv) Examination of the linking possibility for a two-word phrase by using simple grammar Example: If according to the grammar "a noun is related as a subjective case to an immediately following verb," it is determined that 'Sunday' in an ill-formed sentence "Sunday comes . . ." is related as a subjective case to 'come.'

(v) Linking a word at one end and a word at the other end (final linking) Example: If 'comes' and 'by law' in an ill-formed sentence "Sunday comes by law" are separated from each other by different constituent structure trees, the adjacent 'comes' and 'by law' are finally linked ('law' relates to 'comes' via 'by').

The constituent structure trees are linked with a more exact relationship in the above described manner. Since linking is always possible in (v), the rule is relaxed to (v), and for any case one structure tree can finally be output.

F. Examination of Linking Possibility for Constituent Structure Trees

The linking possibility for the constituent structure trees is examined as follows.

First, a check is performed to determine whether or not a root node of one of the constituent structure tree relates either to a root of the other constituent structure tree or to a node that is positioned externally (since cross linking occurs if an external constituent structure tree that reflects the word order relates to an internal node, the reference range can be restricted while avoiding that occurrence). The possibility that the two nodes can be linked is determined by the above described linking determination rules.

When the following two constituent structure trees are linked together.

TABLE 5

(a) The stone wall house by the lake

```
             ---The
             |
             |---wall---|---stone
             |
house---|---by---|
             |       |---lake---|---the
```

(b) always crowded with visitors.

```
Crowded---|---always
          |
          |---with---|---visitors
```

When structure (b) can be linked with structure (a) (since normally the modification destination is limited to only one word), a word that can relate to the other word in structure (b) is the word at a root that has not yet been related to any word, i.e., "crowded" in this case. On the other hand, the independent words "house" and "lake" that are included in "house by lake the," in the lower portion of structure (a), can be modified from the right side of the sentence. More specifically, an examination is conducted to determine whether or not "crowded" can modify "house" and whether or not "crowded" can modify "lake," and "crowded" may finally be linked with either "house" or "lake."

G. Specific Example

The operations performed in the above process will now be explained by using a specific example.

Suppose that the following English sentence is to be parsed:

As you can see, you can choose from many topics to find out what information is available about the AS/400 system. This is the 53rd sentence of Chapter 6 in the "IBM* Application System/400 New User's Guide Version 2," IBM Corp. (1992) (*IBM Trademark). This could not be parsed by a PEG parser (see K. Jensen: "PEG: The PLNLP English Grammar, "Natural Language Processing: The PLNLP Approach, K. Jensen, G. Heidorn, and S. Richardson, eds., Boston, Mass.: Kluwer Academic Publishers (1992)), and was determined to be an ill-formed sentence. The output shown in FIG. 5 is obtained as a combination of partial parsing results.

In the parsing result in FIG. 5, the following portion is picked up:

TABLE 6

| | | |
|---|---|---|
| (NOUN* | "topics" ("topic" PL)) | |
| (RELCL | (NP | (PRON* "you" ("you" SG PL)))) |
| | (AUXP | (VERB* "have" ("have" PS))) |
| | (AVP | (ADV* "already" ("already" BS))) |
| | (VERB* | "chosen" ("chosen" EN)))) |

The meaning of this listed structure is, for example.

TABLE 7

| (NOUN* | "topics" | ("topic" | PL)) |
|---|---|---|---|
| ↑ | ↑ | ↑ | ↑ |
| (phrase marker | word form | (original word form | grammer attribute)). |

The represented forms in this portion are linked together, and the original sentence, "topics you have already chosen" can be reconstructed.

The grammar attribute represents

TABLE 8

| SG | singular form (singular) |
|---|---|
| PL | plural form (plural) |
| BS | original form (basic form of an adjective, etc., that is not a comparative or superlative form) (base) |
| PS | original form (present tense form) (present) |
| EN | past participle form |

It should be noted however that these representations depend on the PEG parser, and the representation form differs in consonance with the parser that is used.

G1. Morphological Analysis (Division of an Input Sentence and Reference to a Dictionary)

A common morphological analysis is performed. More specifically, an input sentence is decomposed into words, and by referring to a dictionary, an original form and a part of speech are assigned to each of the individual words. Through this process, when the same word row is to be searched for in the same context, a change in word form can be absorbed and an attached word can be identified so that the search for the attached word can be prevented.

The processing result of an example sentence at this step is shown in FIG. 6. The abbreviations of the parts of speech are as follows.

N=noun, V=verb, AV=adverb, AJ=adjective, CJ=conjunction, PP=preposition, and DET=determiner

G2. Search for and Extraction of Context Information

A sentence that has the same word row, which is as long as possible, is searched for among the sentences (well-formed sentences) in the discourse that were parsed in the same context. When such a sentence is found, information for parsing the matched word row is extracted. This process is performed starting at the first word of the sentence so that the word rows that contain context information cover the entire sentence. (At this time, the search is not performed for such words that it has been decided are prepositions or determiners by referring to the dictionary information.) In the example sentences in FIG. 7 are shown the word rows and the sentence numbers that can be searched for in the well-formed sentences that are a part of the same discourse from the same manual. In FIG. 7 especially, the annotated symbol "←39th sentence 175th sentence" indicates that the same word row as "As you can see" is included in the 39th sentence and the 175th sentence that are contained a part of the input discourse. In FIG. 7 is further shown the analyzation results for the individual portions of the word row "As you can see." In addition, the entire sentence that includes that word row, and the parsing information that is extracted from the parsing results for that sentence are shown in FIGS. 8 through 16.

G3. Narrowing Down of Available Choices for the Parts of Speech by Referring to Context Information The choices for the parts of speech of the individual words are narrowed down by referring to the context information that is assigned in the previous process. Essentially, the parts of speech that are not assigned for the other sentences are removed from the parts of speech choices for the words for which context information could be extracted.

Through this process, the available grammar rules that will be applied for the next process can be narrowed down, and the complexity of the process can be reduced. The result that can be obtained by a process that narrows down the choices for the parts of speech in the example sentence is shown in FIG. 17. At this time, the parts of speech for the words in the example sentence, with the exception of "what," are determined.

G4. Determination of Linking Structure (Dependency Structure) by Referring to a Grammar and to Context Information Finally, the dependency structures of partial word rows, which are extracted as a result of the parsing of the well-formed sentence in the same context, are linked together to provide a dependency structure for the complete sentence.

Figure 26:
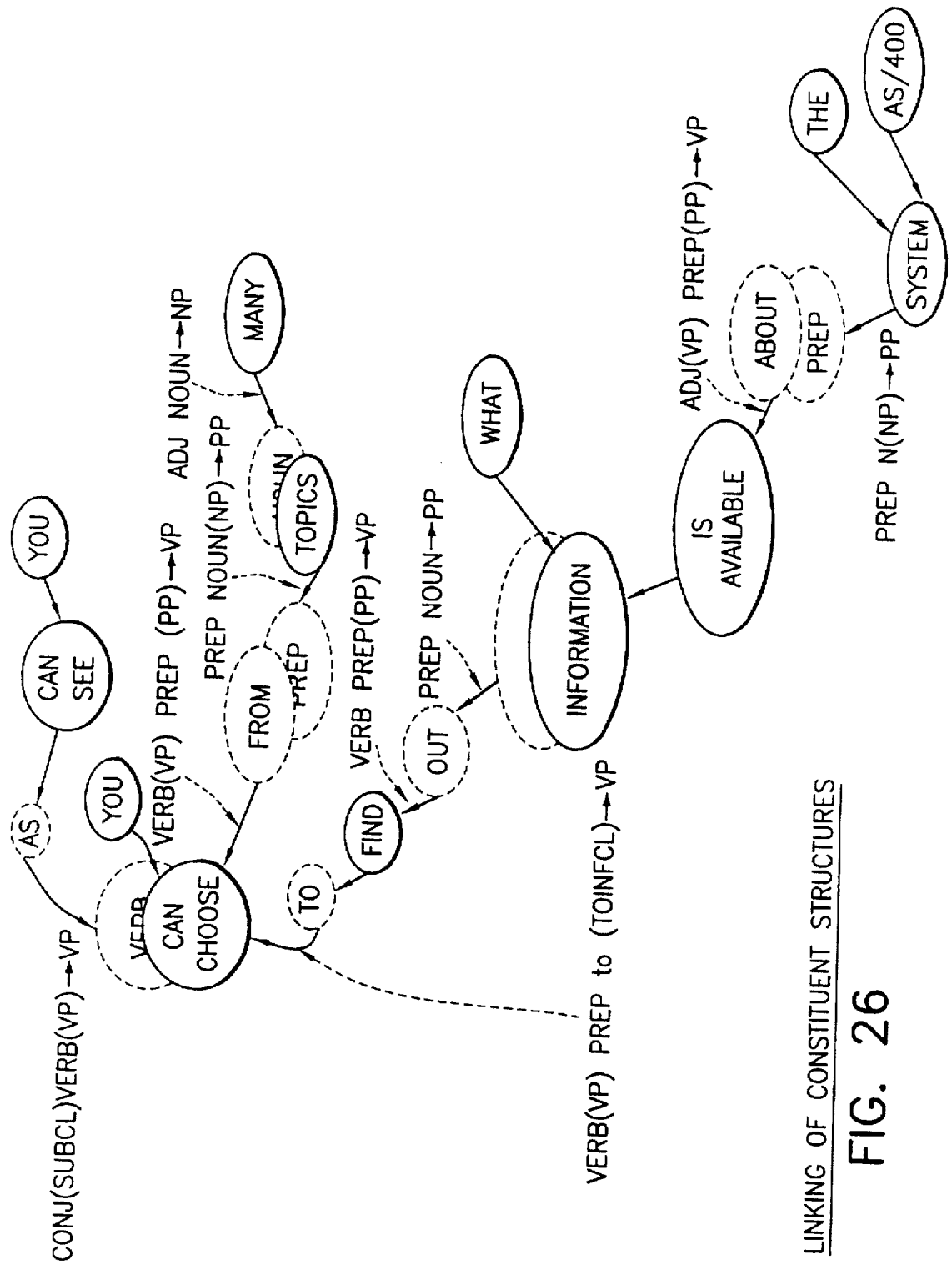
FIG. 26 is a diagram showing the linking of partial structures.
Figure 27:
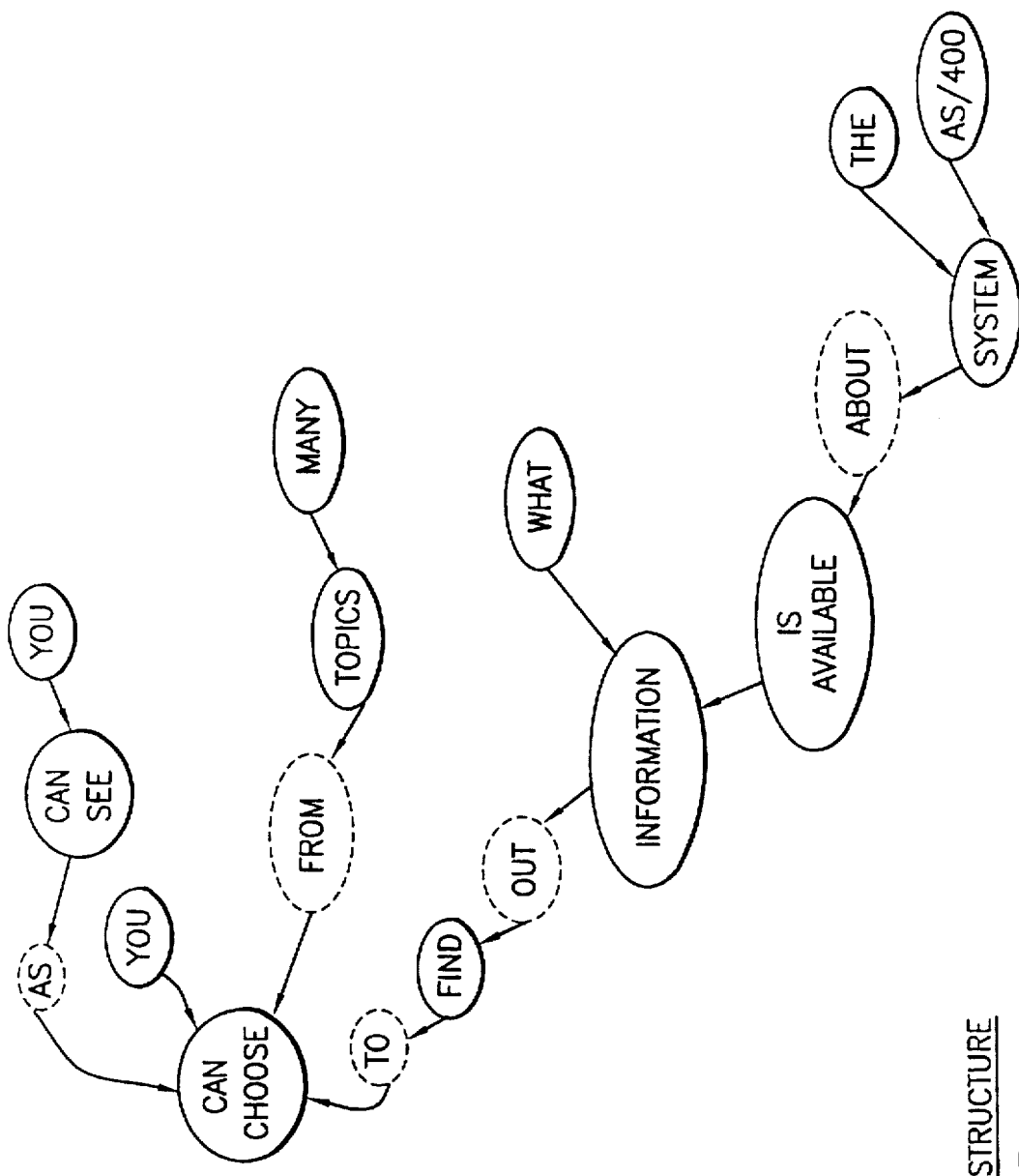
FIG. 27 is a diagram showing a dependency structure that is finally obtained.

Fundamentally, the parsing results for a partial word row is regarded as a dependency structure, and the linking relationship of the dependency structures is determined by referring to the grammar during a conventional parsing method. In this process, a check is performed to determine whether or not the head node of one of the two dependency structures relates to the head of the other dependency structure, or to a node that is positioned outside (in the dependency structure that reflects the word order, a cross linking occurs when an external node relates to an internal node, and the range for reference can be restricted while such an occurrence is avoided). The linking possibility for the two nodes is determined by using the grammar. At this time, by referring to such information as what word the dependency structures of the individual portions relate to, and where that word is positioned, before or after the well-formed sentence, the processing is performed to assign a priority to a linking relationship to a word that has the same part of speech and that is positioned the same as the original word. The dependency structures of the individual portions in the example sentence are shown in FIGS. 18 through 25; the linked points and the employed grammatical principles are shown in FIG. 26; and the dependency structure for the complete sentence that is finally obtained is shown in FIG. 27.

H. Second Embodiment (Selection of a Plurality of Parsed Structures by Referring to Context Information)

The above described embodiment is employed to parse an ill-formed sentence as accurately as possible by referring to context information. The present invention is not limited to this purpose, and may be employed to select, by referring to context information, the most appropriate interpretation among a plurality of interpretations that are essentially different.

A specific example of such a sentence that can be interpreted in several ways that are essentially different is "Time flies like an arrow." The possible interpretations of this sentence are as follows:

(1) a declarative sentence with "flies" as a main verb and "Time" as a subject.

(2) an imperative sentence with "Time" as a main verb.

(3) a declarative sentence with "like" as a main verb and "Time flies" as a subject.

(4) regarding the whole as a noun phrase.

In the second embodiment, the processing for selecting a choice by referring to context information is performed on such sentences for which a plurality of interpretations can be provided, instead of ill-formed sentences.

H1. Context Analysis Block

Figure 28:
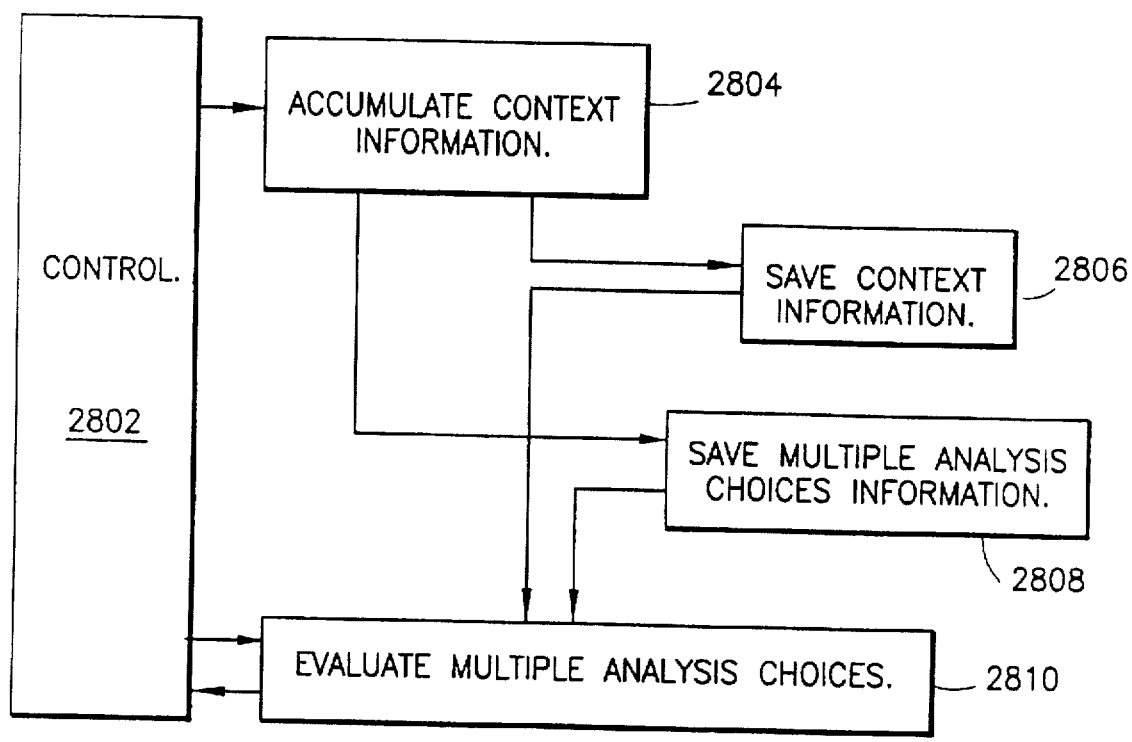
FIG. 28 is a diagram illustrating a context analyzation block according to the second embodiment of the present invention.

Although the arrangement in FIG. 1 is also commonly used in the second embodiment, the context analysis block is slightly different from that in FIG. 1, and is as shown in FIG. 28.

In FIG. 28, a control block 2802 controls the operations of the individual components, and serves as the main routine of a program.

A context information accumulation block (unit) 2804 ascertains whether or not there is only one parsing result for each sentence. The information for those sentences that have only one choice is stored in a context information storage block (unit) 2806. The information for those sentences that have a plurality of choices is stored in a multiple analysis choices information storage block 2808.

A block (unit) 2810 for evaluating multiple analysis choices provides an evaluation value for each of the multiple choices for those sentences that have multiple choices, and stores the choice that has the maximum evaluation value in the context information storage unit 2806. A specific method for providing an evaluation value will be described in detail later.

H2. Outline of the Processing

Figure 29:
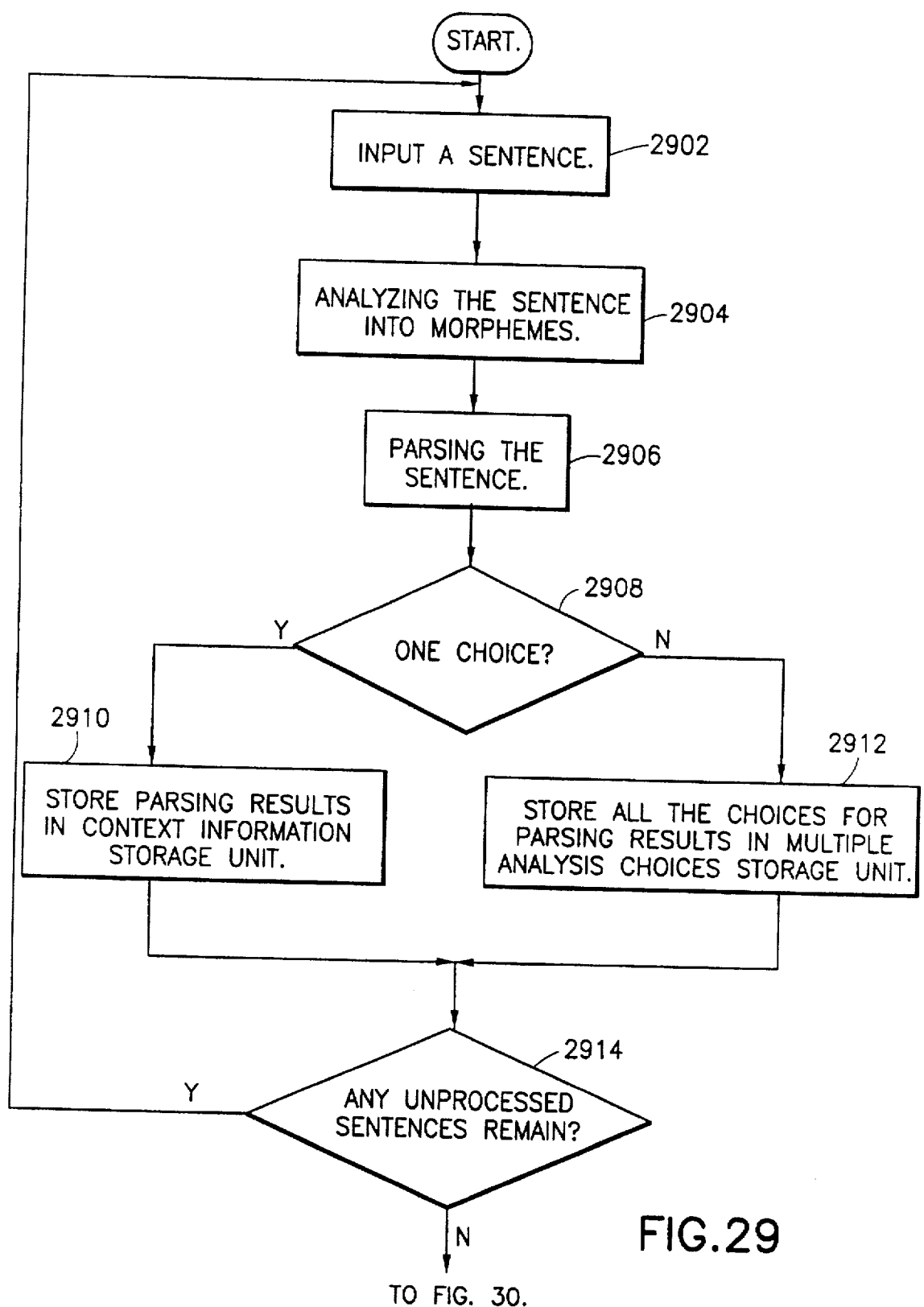
FIG. 29 is a flowchart showing the processing procedures by which one of a plurality of parsing results of a sentence is selected by referring to context information.

The outline of the process that is performed by the control block 202 or 2802 in FIG. 1 or 28 will now be described while referring to the flowcharts in FIGS. 29 and 30. First, at step 2902 in FIG. 29, sentences are input. Reading is performed in units of a single sentence that is terminated by a full stop, a "." in English.

At step 2904, a morphological analysis process is performed wherein the sentence that is input is decomposed into words, and the parts of speech and the manner in which the words are used are determined by examining a dictionary.

At step 2906, parsing is performed in consonance with the information that was obtained during the morphological analysis, and information for constructing a structure tree is generated.

At step 2908, a check is performed to determine whether or not the parsing result includes a plurality of choices. Since a specific parser may return a plurality of the parsed choices described above for a sentence, for example, "Time flies like an arrow.", the determination at step 2908 can be made by ascertaining the count for these choices.

If, at step 2908, the parsing result has only one choice, at step 2910 the parsing result for the sentence is stored in the context information storage unit 2806. The parsing result consists of context information for each sentence and context information for each word that is extracted from the context information. The context information for each sentence includes a sentence number, an input character row, and parsing results (information about which words in the sentence relate to which other words, and what is their linking relationship (subjective case, objective case, preposition, etc.)). The context information for each word includes a character row of a surface word (original form), a word (or its ID) that is related to an original word and their linking relationship, and a word (or its ID) that the original word is related to and their linking relationship.

If, at step 2908, the sentence has a plurality of interpretation choices, at step 2912 all the choices obtained by parsing are stored in the multiple analysis choices storage unit 2808. When the procedure at step 2910 or 2912 is completed, at step 2914 a check is performed to determine whether all sentences have been processed. If at least one sentence remains to be processed, program control returns to step 2902.

Figure 30:
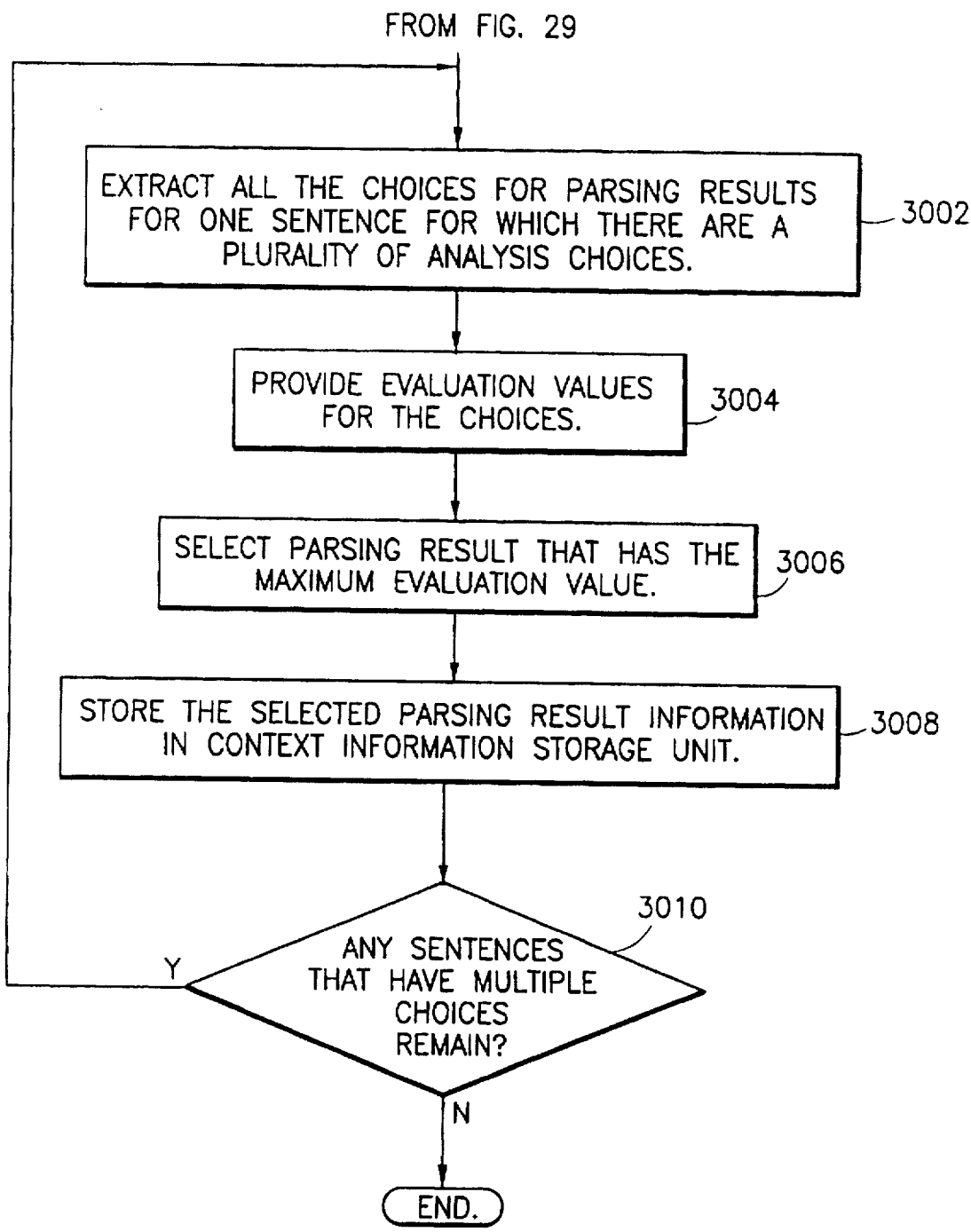
FIG. 30 is a flowchart showing the processing for selecting one of a plurality of parsing results of a sentence by referring to context information.

If, at step 2914, there is no sentence remaining to be processed, it is assumed that the parsing of all the sentences in the discourse has been completed, and program control advances to the process in the flowchart in FIG. 30. The processing unit by which at step 2914 it is determined that the processing has been completed comprises about 100 to 300 sentences (about the equivalent in size, for example, of one chapter of a computer manual). A user, however, can designate processing units as needed.

At step 3002 in FIG. 30, one sentence for which there are a plurality of analysis choices is extracted from the multiple analysis choices information storage unit 2808.

At step 3004, an evaluation value is provided for each choice by referring to the context information that is stored in the context information storage unit 2806.

At step 3006, the choice that has the maximum evaluation value is selected.

At step 3008, the parsing result that is selected in the above described manner is stored in the context information storage unit 3008.

At step 3010, a check is performed to determine whether all sentences that have multiple choices have been processed. If at least one such sentence remains to be processed, program control returns to step 3002.

If, at step 3010, there is no sentence that has multiple choices remaining to be processed, the process is thereafter terminated.

H3. Example that has Multiple Choices for Parsing a Sentence

The following four parsing results are obtained for the sentence "Time flies like an arrow.":

(1) a declarative sentence with "flies" as a main verb and "Time" as a subject.

```
flies <verb>
  |--- (SUBJ) --- Time <noun>
  |--- (like) --- arrow <noun>
```

(2) an imperative sentence with "Time" as a main verb.

```
Time <verb>
  |--- (OBJ) --- flies <noun>
          |--- ? --- (like) --- arrow <noun>
```

(3) a declarative sentence with "like" as a main verb and "Time flies" as a subject.

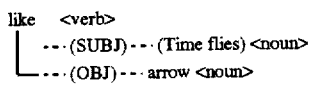

(4) regarding the whole as a noun phrase.

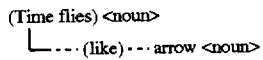

These results are stored as the determinations at step 2908 in the multiple analysis choices information storage unit 2808, in association with the sentence "Time flies like an arrow."

H4. Provision of an Evaluation Value for Each Parsing Result by Referring to Context Information In this embodiment, an evaluation value is provided, to represent the degree to which the context information is matched, for analyzed structures by which a target sentence can be interpreted. The degree to which the context information is matched is represented by a value so that the following elements are increased:

(1) a ratio for the presence of a word that has the same linking relationship as the identical word in the context;

(2) a ratio for the presence of the same word that has the same part of the speech; and (3) the correspondence of a sentence type to an adjacent sentence.

Taking as an example the parsing results for the declarative sentence "Time flies like an arrow" wherein "flies" is a main verb and "Time" is a subject, for the element (1), sentences in the context in which "files" is a main verb and "Time" is a subject are counted, and the resultant value is divided by the total sentence count to acquire the evaluation value. For the element (2), sentences in the context in which "Time" is used as a noun are counted, and that count is divided by the count of the instances in the context where "time" is used. The evaluation value for the use of "Time" as a noun is thus calculated. For the element (3), a high evaluation value is given when the sentence type corresponds to that of the adjacent sentence in consonance with a declarative, an imperative, an interrogative, or another sentence type. When the sentence type does not correspond, a low evaluation value is given. It is desirable that the parsing result evaluation be arrived at by combining (1), (2) and (3), but in some cases an evaluation value can be provided by combining only (1) and (2) or even by employing only (1).

H5. Necessity for Selection From Among Multiple Choices

From research that involved the parsing of 736 sequential sentences in a computer manual, the following results were obtained:

total sentences input: 736 sentences (processed after they were divided into two groups of 400 sentences and 336 sentences) sentences yielding multiple parsing results: 150 sentences.

After the exclusion of 24 sentences, for which the multiple parsing results were only slightly different and for which multiple parsing results could not be employed due to parsing errors, 126 sentences remained, for which the selection process and the determination of the most appropriate interpretation were required.

To select the correct structure from among the multiple parsing results, the evaluation values that were assigned to the 126 sentences for the elements that matched the context information were compared, and the following results were obtained.

the ratio for the presence in the context of a word that had the same linking relationship of the same word.

the ratio where a difference existed between the choices: 42.9% (54 sentences/126 sentences)

the ratio where a maximum evaluation value was provided for the most appropriate parsing result: 88.9% (48 sentences/54 sentences)

the ratio for the presence in the context of a word that had the same part of speech.

the ratio where a difference existed between the choices: 44.4% (56 sentences/126 sentences)

the ratio where a maximum evaluation value was provided for the most appropriate parsing result: 66.1% (37 sentences/56 sentences)

correspondence of sentence type with an adjacent sentence the ratio where a difference existed between the choices: 49.2% (62 sentences/126 sentences)

the ratio where a maximum evaluation value was provided for the most appropriate parsing result: 77.4% (48 sentences/62 sentences)

These results prove that employing the degree to which parsing results match the context information is an effective means by which to select a correct structure from among multiple parsing results.

As described above, according to the present invention, an ill-formed sentence, which cannot be properly processed by a conventional natural language processing system, and a sentence for which there are multiple parsing results can be parsed with high accuracy by referring to context information.

Although the processing for an ill-formed sentence and the processing for a sentence for which there are multiple parsing results have been explained in the separate embodiments, according to the present invention, a system that comprises the features of both embodiments can be designed.

For example, after ill-formed sentences have been properly interpreted according to context information, the processing of a sentence among those that have multiple analysis choices may be performed by referring to the context information. Or, after sentences that have multiple analysis choices have been processed by referring to the context information and the processing results are added to the context information, the processing of an ill-formed sentence may be performed by referring to the context information.

In addition, although the parsing of English sentences has been employed for the explanations of the above embodiments, the application of the present invention is not limited to a specific language, and the present invention can be applied to an optional natural language processing program that uses a parser for sentences that are written in Japanese, German, French, Russian, Chinese, Korean, and other languages.

I claim:

1. A computer implemented natural language analysis method, comprising the steps of:

(a) inputting a plurality of sentences described in natural language;

(b) analyzing said plurality of sentences into morphemes;

(c) parsing said plurality of sentences based on those results that are obtained by said morphological analysis;

(d) when those results that are obtained by said parsing are well-formed sentences, storing said parsing analysis results as well-formed context information;

(e) when those results that are obtained by said parsing are ill-formed sentences, storing said parsing analysis results as ill-formed sentence information;

(f) upon completion of said parsing of said plurality of sentences, retrieving, from said well-formed context information, partial parsing information for sentences having parsing analysis results that were stored as said ill-formed sentence information; and (g) parsing once more said sentences having parsing analysis results that were stored as said ill-formed sentence information by using said information retrieved from said well-formed context information.

2. A natural language analysis method according to claim 1, wherein said well-formed context information that is stored includes context information for each sentence and context information for each word.

3. A natural language analysis method according to claim 2, wherein said context information for each sentence includes a sentence number, input character rows, and information about a sentence parsing result.

4. A natural language analysis method according to claim 2, wherein said context information that is stored for each word includes a character row of a surface structure, a word by which one word is modified and a connection relationship, and a word that said one word modifies and a connection relationship.

5. A natural language analysis method according to claim 1, wherein said ill-formed sentence information that is stored includes morphological analysis results and context information for each sentence, and context information for each word.

6. A computer implemented natural language analysis system, comprising:

(a) means for inputting a plurality of sentences described in natural language;

(b) means for analyzing said plurality of sentences into morphemes;

(c) means for parsing said plurality of sentences based on those results that are obtained by said morphological analysis;

(d) means for, when those results that are obtained by said parsing are well-formed sentences, storing said parsing analysis results as well-formed context information;

(e) means for, when those results that are obtained by said parsing are ill-formed sentences, storing said parsing analysis results as ill-formed sentence information;

(f) means for, upon completion of said parsing of said plurality of sentences, retrieving, from said well-formed context information, partial parsing information for sentences having parsing analysis results that were stored as said ill-formed sentence information; and (g) means for parsing once more said sentences having parsing analysis results that were stored as said ill-formed sentence information by using said information retrieved from said well-formed context information.

7. A natural language analysis system according to claim 6, wherein said well-formed context information that is stored includes context information for each sentence and context information for each word.

8. A natural language analysis system according to claim 6, wherein said ill-formed sentence information that is stored includes morphological analysis results and context information for each sentence, and context information for each word.

9. A computer implemented natural language analysis method, comprising the steps of:

(a) inputting a plurality of sentences described in natural language;

(b) analyzing said plurality of sentences into morphemes;

(c) parsing said plurality of sentences based on those results that are obtained by said morphological analysis;

(d) when the results of said parsing are well-formed sentences, storing, as well-formed context information, parsing information that includes information about word connections;

(e) when the results of said parsing are ill-formed sentences, storing, as ill-formed sentence information, parsing information that includes information about word rows;

(f) upon the completion of said parsing of said plurality of sentences, retrieving, from said well-formed context information, information about a word row connection that is the same as each sentence having parsing information that was stored as said ill-formed sentence information; and (g) assembling phrase structure trees based on said information that is retrieved from said well-formed context information.

10. A computer implemented natural language analysis method, comprising the steps of:

(a) inputting a plurality of sentences described in natural language;

(b) analyzing said plurality of sentences into morphemes;

(c) parsing said plurality of sentences based on those results that are obtained by said morphological analysis;

(d) when said results of said parsing are well-formed sentences, storing, as well-formed context information, parsing information that includes information about word connections;

(e) when the results of said parsing are ill-formed sentences, storing, as ill-formed sentence information, parsing information that includes information about word rows;

(f) upon completion of said parsing of said plurality of sentences, retrieving, from said well-formed context information, information about a word row connection that is the same as each sentence having parsing information that was stored as said ill-formed sentence information;

(g) determining whether or not all words in a sentence having parsing information that was stored as said ill-formed sentence information are dominated by information that is retrieved from said well-formed context information, and if there are words that are not so dominated, extracting information for said words from said ill-formed sentence information; and (h) connecting phrase structure trees by applying said context information and grammar information to information that is obtained at said steps (f) and (g).

11. A natural language processing method according to claim 10, further comprising a step of determining whether or not said phrase structure trees are united for each sentence, and if not, selecting a less strict connection rule that is included in said grammar information to reconnect said phrase structure trees.

12. A computer implemented natural language analysis system, comprising:
   (a) means for inputting a plurality of sentences described in natural language;
   (b) means for analyzing said plurality of sentences into morphemes;
   (c) means for parsing said plurality of sentences based on those results that are obtained by said morphological analysis;
   (d) means for, when the results of said parsing are well-formed sentences, storing, as well-formed context information, parsing information that includes information about word connections;
   (e) means for, when the results of parsing are ill-formed sentences, storing, as ill-formed sentence information, parsing information that includes information about word rows;
   (f) means for, upon completion of said parsing of said plurality of sentences, retrieving, from said well-formed context information, information about a word row connection that is the same as each sentence having parsing information that was stored as said ill-formed sentence information;
   (g) means for assembling phrase structure trees based on said information that is retrieved from said well-formed context information.

13. A computer implemented natural language analysis system, comprising:
   (a) means for inputting a plurality of sentences described in natural language;
   (b) means for analyzing said plurality of sentences into morphemes;
   (c) means for parsing said plurality of sentences based on those results that are obtained by said morphological analysis;
   (d) means for, when said results of said parsing are well-formed sentences, storing, as well-formed context information, parsing information that includes information about word connections;
   (e) means for, when the results of said parsing are ill-formed sentences, storing, as ill-formed sentence information, parsing information that includes information about word rows;
   (f) means for, upon completion of said parsing of said plurality of sentences, retrieving, from said well-formed context information, information about a word row connection that is the same as each sentence having parsing information that was stored as said ill-formed sentence information;
   (g) means for determining whether or not all words in a sentence having parsing information that was stored as said ill-formed sentence information are dominated by information that is retrieved from said well-formed context information, and if there are words that are not so dominated, extracting information for said words from said ill-formed sentence information;
   (h) means for storing grammar information includes word connection rule; and
   (i) means for connecting phrase structure trees by applying said context information and grammar information stored in said storing means to information that is obtained from said retrieving means and said determining means.

14. A natural language processing system according to claim 13, further comprising means for determining whether or not said phrase structure trees are united for each sentence, and if not, selecting a less strict connection rule that is included in said grammar information to reconnect said phrase structure trees, wherein said means (h) possesses a plurality of connection rules that consist of a more strict connection rule and a less strict connection rule.

15. A computer implemented natural language analysis method, comprising the steps of:
   (a) inputting a plurality of sentences described in natural language;
   (b) analyzing said plurality of sentences into morphemes;
   (c) parsing said plurality of sentences based on those results that are obtained by said morphological analysis;
   (d) when the results of said parsing present a single analysis choice, storing said parsing result as context information;
   (e) when the results of said parsing present a plurality of analysis choices, storing said parsing result as sentence information for multiple analysis choices;
   (f) upon completion of said parsing of said plurality of sentences, comparing said sentence information for multiple analysis choices with information from among said well-formed context information, and determining an evaluation value for said analysis choice; and
   (g) selecting, as said sentence parsing information from among said multiple analysis choices, an analysis choice that has a maximum evaluation value.

16. A natural language processing method according to claim 15, wherein said step of determining said evaluation value includes a process for calculating the ratio of the presence in a context of a word that has the same linking relationship as an identical word to a total amount of said plurality of sentences inputted.

17. A natural language processing method according to claim 15, wherein said step of determining said evaluation value includes a process for calculating the ratio of the presence in a context of words having the same parts of speech to a total amount of instances of said context of words.

18. A natural language processing method according to claim 15, wherein said step of determining said evaluation value includes a process for calculating a correspondence of a sentence type with an adjacent sentence.

19. A computer implemented natural language analysis system, comprising:
   (a) means for inputting a plurality of sentences described in natural language;
   (b) means for analyzing said plurality of sentences into morphemes;
   (c) means for parsing said plurality of sentences based on those results that are obtained by said morphological analysis;
   (d) means for, when the results of said parsing present a single analysis choice, storing said parsing result as context information;
   (e) means for, when the results of said parsing present a plurality of analysis choices, storing said parsing result as sentence information for multiple analysis choices;
   (f) means for, upon completion of said parsing of said plurality of sentences, comparing said sentence information for multiple analysis choices with information from among said well-formed context information, and determining an evaluation value for said analysis choice; and (g) means for selecting, as said sentence parsing information from among said multiple analysis choices, an analysis choice that has a maximum evaluation value.

20. A natural language processing system according to claim 19, wherein said means for determining said evaluation value includes a process for calculating the ratio of the presence in a context of a word that has the same linking relationship as an identical word to a total amount of said plurality of sentences inputted.

21. A natural language processing system according to claim 19, wherein said means for determining said evaluation value includes a process for calculating the ratio of the presence in a context of words having the same parts of speech to a total amount of instances of said context of words.

22. A natural language processing system according to claim 19, wherein said means for determining said evaluation value includes a process for calculating a correspondence of a sentence type with an adjacent sentence.

* * * * *